United States Patent
Kageyama et al.

(10) Patent No.: US 6,509,435 B1
(45) Date of Patent: Jan. 21, 2003

(54) POLYCABONATE, PROCESS FOR PRODUCING THE SAME, AND MOLDED ARTICLE THEREOF

(75) Inventors: Yuichi Kageyama, Iwakuni (JP); Hiroaki Kaneko, Iwakuni (JP); Wataru Funakoshi, Iwakuni (JP); Katsushi Sasaki, Iwakuni (JP)

(73) Assignee: Teijin Limited, Osaka (JP)

( * ) Notice: Subject to any disclaimer, the term of this patent is extended or adjusted under 35 U.S.C. 154(b) by 182 days.

(21) Appl. No.: 09/959,829

(22) PCT Filed: Sep. 22, 2000

(86) PCT No.: PCT/JP00/06516

§ 371 (c)(1),
(2), (4) Date: Nov. 8, 2001

(87) PCT Pub. No.: WO01/70849

PCT Pub. Date: Sep. 27, 2001

(30) Foreign Application Priority Data

Mar. 22, 2000 (JP) .......................................... 2000-080071

(51) Int. Cl.⁷ ............................................... C08G 64/00
(52) U.S. Cl. ...................... 528/196; 264/176.1; 428/64
(58) Field of Search ................................. 528/196, 198; 428/64; 264/176.1

(56) References Cited

U.S. PATENT DOCUMENTS 5,696,222 A    12/1997   Kaneko et al.

FOREIGN PATENT DOCUMENTS

| JP | 61 87724 A | 5/1986 |
|----|------------|--------|
| JP | 61 87725 A | 5/1986 |
| JP | 2000-128977 | 5/2000 |

Primary Examiner—Terressa M. Boykin
(74) Attorney, Agent, or Firm—Sughrue Mion, PLLC

(57) ABSTRACT

A polycarbonate which is stable against thermal decomposition at a temperature range for melt molding without adding a heat resistant stabilizer and suitable for the melt molding of a thin product, production method and molded products thereof. The polycarbonate is comprising mainly a recurring unit represented by the following formula (1),

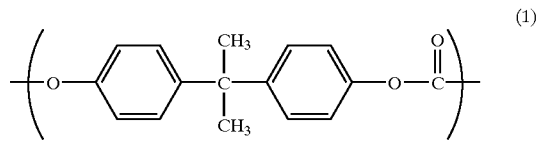

and has a percentage of the total of integrated intensities of all signals detected at four ranges, $\delta=2.14$ to $2.17$ ppm, $\delta=3.46$ to $3.49$ ppm, $\delta=3.62$ to $3.69$ ppm and $\delta=5.42$ to $5.46$ ppm to the integrated intensity of a signal derived from a methyl group detected at a range of $\delta=1.50$ to $2.00$ ppm of $0.01$ to $2.0\%$ in its $^1$H-NMR spectrum in heavy chloroform and a viscosity average molecular weight of $10,000$ to $100,000$.

18 Claims, No Drawings

POLYCABONATE, PROCESS FOR PRODUCING THE SAME, AND MOLDED ARTICLE THEREOF

FIELD OF THE INVENTION

The present invention relates to a polycarbonate having excellent heat resistant stability, a method for preparing and molded products thereof. More specifically, it relates to a polycarbonate which has a specific signal having specific integrated intensity in its $^1$H-NMR spectrum, rarely experiences a reduction in mechanical strength caused by thermal decomposition and is suitable for the melt molding of a thin product, a method for preparing and molded products thereof.

PRIOR ART

Polycarbonates are engineering plastics which are excellent in mechanical strength, color and transparency. They have recently been used for various purposes and formed into various molded products. Due to excellent mechanical strength, they are frequently used as a material for thin products such as disk substrates and housings for electric products.

The molding of polycarbonates is mainly melt molding. Since polycarbonates have high melt viscosity, they have low melt fluidity and moldability. Therefore, a thin product is generally formed by melt molding at a high temperature of 250 to 400° C. However, it is a heretofore problem that the thermal decomposition of polycarbonates readily occurs at such a high temperature, thereby causing quality deterioration such as a reduction in the mechanical strength of a molded product. Accordingly, the development of a polycarbonate which is stable against thermal decomposition at a temperature range for melt molding has been desired not to reduce the mechanical strength of a melt molded product.

As means of improving the heat resistant stability of a polycarbonate, there has been known a method in which a heat resistant stabilizer is mixed into a polymer. However, a polycarbonate containing a heat resistant stabilizer has such a problem that the heat resistant stabilizer exerts a bad influence upon the characteristic properties such as color, transparency and mechanical strength of the polycarbonate as well as a defect in production process and an increase in cost.

It is disclosed by JP-A 61-87724 and JP-A 61-87725 (the term "JP-A" as used herein means an "unexamined published Japanese patent application") that a terminal hydroxyl group exerts a bad influence upon the heat resistant stability of a polycarbonate. In the melt polymerization method or solid-phase polymerization method in which many terminal hydroxyl groups are essentially existent in the molecule owing to the characteristics of a polymer production process, various methods for reducing the number of terminal OH groups of a polycarbonate have been proposed ardently. It is known that there is limitation to the reduction of the number of OH terminal groups.

Under the situation, the development of a polycarbonate which is stable against thermal decomposition without adding a heat resistant stabilizer to produce a polycarbonate simply at a low cost and taking a special measure of reducing the number of OH terminal groups, suitable for the melt molding of a thin product and produced more easily at a lower cost than existing polycarbonates has been strongly desired.

SUMMARY OF THE INVENTION

It is an object of the present invention to provide a polycarbonate which is stable against thermal decomposition at a temperature range for melt molding without adding a heat resistant stabilizer and suitable for the melt molding of a thin product.

It is another object of the present invention to provide an industrially advantageous method of producing the above polycarbonate of the present invention.

It is still another object of the present invention to provide a molded product of the above polycarbonate of the present invention.

Other objects and advantages of the present invention will become apparent from the following description.

Firstly, according to the present invention, the above objects and advantages of the present invention are attained by an aromatic polycarbonate which is comprising mainly a recurring unit represented by the following formula (1):

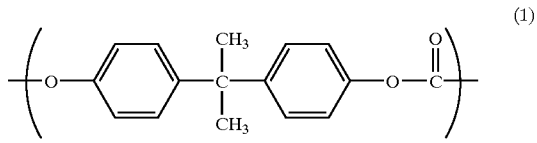

and has a percentage of the total of integrated intensities of all signals detected at four ranges, δ=2.14 to 2.17 ppm, δ=3.46 to 3.49 ppm, δ=3.62 to 3.69 ppm and δ=5.42 to 5.46 ppm to the integrated intensity of a signal derived from a methyl group detected at a range of δ=1.50 to 2.00 ppm of 0.01 to 2.0% in its $^1$H-NMR spectrum in heavy chloroform and a viscosity average molecular weight of 10,000 to 100,000.

Secondly, according to the present invention, the above objects and advantages of the present invention are attained by a method for preparing an aromatic polycarbonate (may be referred to as "first production method of the present invention" hereinafter), which comprises polycondensing an aromatic dihydroxy compound comprising mainly bisphenol A and a carbonic acid diester in the presence of, as an ester exchange catalyst, an alkali metal compound and a nitrogen-containing basic compound and/or a phosphorus-containing basic compound and, as a co-catalyst, a sulfur-containing compound, the alkali metal compound being used in an amount of $1 \times 10^{-7}$ to $1 \times 10^{-5}$ equivalent in terms of alkali metal atoms and the nitrogen-containing basic compound and/or the sulfur-containing basic compound being used in a total amount of $5 \times 10^{-5}$ to $1 \times 10^{-3}$ equivalent in terms of nitrogen atoms and/or phosphorus atoms based on 1 mol of the aromatic dihydroxy compound, and the sulfur-containing compound being used in an amount of 0.1 to 100 atoms in terms of sulfur atoms based on 1 atom of the alkali metal of the alkali metal compound, so as to form the above aromatic polycarbonate of the present invention.

Thirdly, according to the present invention, the above objects and advantages of the present invention are attained by a method for preparing an aromatic polycarbonate (may be referred to as "second production method of the present invention" hereinafter), which comprises polycondensing an aromatic dihydroxy compound comprising mainly bisphenol A and a carbonic acid diester in the presence of, as an ester exchange catalyst, an alkali metal compound and a nitrogen-containing basic compound and/or a phosphorus-containing basic compound and a C-radical scavenger, the alkali metal compound being used in an amount of $1 \times 10^{-7}$ to $1 \times 10^{-5}$ equivalent in terms of alkali metal atoms and the nitrogen-containing basic compound and/or the phosphorus-containing basic compound being used in a total amount of $5 \times 10^{-5}$ to $1 \times 10^{-3}$ equivalent in terms of nitrogen atoms and/or phosphorus atoms based on 1 mol of the aromatic dihydroxy compound, and the C-radical scavenger being used in an amount of 0.0001 to 5 parts by weight based on 100 parts by weight of the formed aromatic polycarbonate, so as to form the aromatic polycarbonate of the present invention.

In the fourth place, according to the present invention, the above objects and advantages of the present invention are attained by a method for preparing an aromatic polycarbonate (may be referred to as "third production method of the present invention" hereinafter), which comprises polycondensing an aromatic dihydroxy compound comprising mainly bisphenol A in the form of an orthorhombic crystal and a carbonic acid diester in the presence of, as an ester exchange catalyst, an alkali metal compound and a nitrogen-containing basic compound and/or a phosphorus-containing basic compound, the alkali metal compound being used in an amount of $1\times10^{-7}$ to $1\times10^{-5}$ equivalent in terms of alkali metal atoms and the nitrogen-containing basic compound and/or the phosphorus-containing basic compound being used in a total amount of $5\times10^{-5}$ to $1\times10^{-3}$ equivalent in terms of nitrogen atoms and/or phosphorus atoms based on 1 mol of the aromatic dihydroxy compound, so as to form the above aromatic polycarbonate of the present invention.

Finally, according to the present invention, the above objects and advantages of the present invention are attained by a molded product of the above aromatic polycarbonate of the present invention.

DESCRIPTION OF THE PREFERRED EMBODIMENT

A preferred embodiment of the present invention will be described in detail hereinafter. A description is first given of the polycarbonate of the present invention.

The main recurring structure of the polycarbonate of the present invention is represented by the following formula (1).

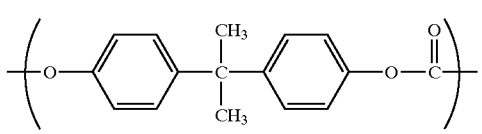

The polycarbonate of the present invention is characterized in that the total of integrated intensities of all signals detected at four ranges, (A) $\delta=2.14$ to 2.17 ppm, (B) $\delta=3.46$ to 3.49. ppm, (C) $\delta=3.62$ to 3.69 ppm and (D) $\delta=5.42$ to 5.46 ppm in the $^1$H-NMR spectrum measured using heavy chloroform as a solvent is 0.01 to 2.0% of the integrated intensity of a signal (reference signal) derived from a methyl group contained in the recurring unit structure of the polymer detected at a range of $\delta=1.50$ to 2.00 ppm in the spectrum.

It is not always known what chemical structures the signals detected at the ranges (A) to (D) are derived from. The above polycarbonate having a specific integrated intensity of a specific signal in the $^1$H-NMR spectrum is characterized in that it has improved stability against thermal decomposition at a temperature range for melt molding and a molded product obtained by melt molding the polycarbonate has high mechanical strength.

Further, the total of integrated intensities of all signals detected at the above ranges (A) to (D) is preferably 0.01 to 1%, particularly preferably 0.01 to 0.8% of the integrated intensity of the reference signal.

When the total of integrated intensities of all signals detected at the above ranges (A) to (D) is smaller than 0.01% or larger than 2% of the integrated intensity of the reference signal, the above effect of improving heat resistant stability cannot be fully obtained.

In the present invention, the signals of the $^1$H-NMR spectrum do not have to be detected at all the four NMR spectral ranges, (A) $\delta=2.14$ to 2.17 ppm, (B) $\delta=3.46$ to 3.49 ppm, (C) $\delta=3.62$ to 3.69 ppm and (D) $\delta=5.42$ to 5.46 ppm, and may be detected at least one of the four ranges (A) to (D).

The specific component which is the feature of the polycarbonate of the present invention can be detected and quantitatively determined by its NMR spectrum which has been measured for integration of 10,000 times. It is a conventionally known fact that the larger the number of times of integration the greater the signal/noise ratio (S/N ratio) of the spectrum becomes, thereby making it possible to detect and quantitatively determine a trace component contained in a sample more definitely and more accurately. For example, it is known that the S/N ratio when the number of times of integration is 5,000 is about 10 times that when the number of times of integration is 50.

In the present invention, a trace component which cannot be distinguished from noise has newly been discovered in the conventionally obtained NMR spectrum by setting the number of times of integration to 10,000 and increasing the S/N ratio fully. It has further been found that there is the above relationship between the content of the component and the effect of improving the heat resistant stability of a polycarbonate by determining the amount of the component in the order of $10^{-2}$% of the signal intensity of a methyl group as a comparison standard though the chemical structure which the component is derived from is unknown.

Preferably, in the $^1$H-NMR spectrum in heavy chloroform of the aromatic polycarbonate of the present invention, the integrated intensity of a signal detected at $\delta=2.14$ to 2.17 ppm is 0 to 1.5%, the integrated intensity of a signal detected at $\delta=3.46$ to 3.49 ppm is 0 to 0.9%, the integrated intensity of a signal detected at $\delta=3.62$ to 3.69 ppm is 0 to 2.0% and the integrated intensity of a signal detected at $\delta=5.42$ to 5.46 ppm is 0 to 0.7%, in respect of the integrated intensity of a signal derived from a methyl group detected at $\delta=1.50$ to 2.00 ppm.

More preferably, in the $^1$H-NMR spectrum in heavy chloroform of the aromatic polycarbonate of the present invention, the total of integrated intensities of all signals detected at two ranges, $\delta=3.46$ to 3.49 ppm and $\delta=3.62$ to 3.69 ppm, is 0.1 to 1.0% in respect of the integrated intensity of a signal derived from a methyl group detected at $\partial=1.50$ to 2.00 ppm.

The aromatic polycarbonate of the present invention has a viscosity average molecular weight of 10,000 to 100,000, preferably 20,000 to 30,000, more preferably 12,000 to 17,000.

The polycarbonate of the present invention which has a preferred viscosity average molecular weight of 20,000 to 30,000 preferably shows signal intensities in the following $^1$H-NMR spectrum.

In the $^1$H-NMR spectrum in heavy chloroform, the integrated intensity of a signal detected at $\delta=2.14$ to 2.17 ppm is 0 to 1.0%, the integrated intensity of a signal detected at $\delta3.46$ to 3.49 ppm is 0 to 0.6%, the integrated intensity of a signal detected at $\delta=3.62$ to 3.69 ppm is 0 to 1.0% and the integrated intensity of a signal detected at $\delta=5.42$ to 5.46 ppm is 0 to 0.5%, in respect of the integrated intensity of a signal derived from a methyl group detected at $\delta=1.50$ to 2.00 ppm.

Further, the polycarbonate having a more preferred viscosity average molecular weight of 12,000 to 17,000 of the present invention preferably shows signal intensities in the following $^1$H-NMR spectrum.

In the $^1$H-NMR spectrum in heavy chloroform, the integrated intensity of a signal detected at δ=2.14 to 2.17 ppm is 0 to 0.4%, the integrated intensity of a signal detected at δ=3.46 to 3.49 ppm is 0 to 0.3%, the integrated intensity of a signal detected at δ=3.62 to 3.69 ppm is 0 to 0.2% and the integrated intensity of a signal detected at δ=5.42 to 5.46 ppm is 0 to 0.1%, in respect of the integrated intensity of a signal derived from a methyl group detected at δ=1.50 to 2.00 ppm.

The aromatic polycarbonate of the present invention is comprising mainly a recurring unit represented by the above formula (1). The recurring unit represented by the above formula (1) accounts for preferably at least 80 mol %, more preferably at least 90 mol %, particularly preferably at least 95 mol % of the total of all the recurring units.

A description is subsequently given of the first production method of the present invention.

The first production method of the present invention comprises the step of polycondensing an aromatic dihydroxy compound comprising mainly bisphenol A and a carbonic acid diester in the presence of an ester exchange catalyst consisting of an alkali metal compound and a nitrogen-containing basic compound and/or a phosphorus-containing basic compound and a co-catalyst consisting of a sulfur-containing compound.

The above method is carried out by a melting process or sold-phase process, preferably by a melting process.

The production of a polycarbonate by the melting process is carried out by stirring an aromatic dihydroxy compound and a carbonic acid diester under normal pressure and/or vacuum nitrogen atmosphere by heating and distilling off the formed alcohol or phenol.

The polycarbonate of the present invention by the melting process can be produced by using diphenyl carbonate as a carbonic acid diester component or a mixture of diphenyl carbonate and di(2-alkoxycarbonylphenyl)carbonate and melt mixing it with 2,2-bis(4-hydroxyphenyl)propane (to be referred to as "bisphenol A" hereinafter) and polymerizing them.

For example, the polycarbonate of the present invention can be produced by reacting a dihydroxy compound with a carbonic acid dieter compound at a temperature of preferably 160 to 300° C., more preferably 180 to 280° C. for preferably 0.2 to 3 hours, more preferably 0.5 to 2 hours, much more preferably 0.6 to 1.5 hours under reduced pressure in the first stage of a reaction, further carrying out the reaction between the dihydroxy compound and the carbonic acid diester compound by increasing the reaction temperature and the vacuum degree of the reaction system, and finally carrying out a polymerization reaction at a reactor inside pressure of $10^{-5}$ to 0.001 mmHg and a temperature of 290 to 330° C. for 10 to 60 minutes.

As described above, the reaction temperature in the latter stage of the reaction for the production of a polycarbonate by the melting process is preferably 290 to 330° C., slightly higher than the temperature generally used, which is effective to advantageously obtain a polycarbonate having a specific integrated intensity of a specific signal in the $^1$H-NMR spectrum of the present invention.

In the latter stage of the reaction, the system is depressurized to make it easy to distill off the formed alcohol or phenol. The inside pressure of the reactor is preferably 0.001 mmHg or less, a higher degree of vacuum than usual, which is effective to advantageously obtain a polycarbonate having a specific integrated intensity of a specific signal in the $^1$H-NMR spectrum of the present invention.

The polycarbonate having a specific integrated intensity of a specific signal in the $^1$H-NMR spectrum of the present invention can be thus preferably produced by carrying out a polymerization reaction at a temperature range of 290 to 330° C. higher than the regular temperature and at a reactor inside pressure of 0.001 mmHg or less higher than the regular degree of vacuum for 10 to 60 minutes.

Examples of the carbonic acid diester used in the present invention include diphenyl carbonate, ditolyl carbonate, bis(2-chlorophenyl)carbonate, m-cresyl carbonate, dinaphthyl carbonate, bis(4-phenylphenyl)carbonate, dimethyl carbonate, diethyl carbonate, dibutyl carbonate, dicyclohexyl carbonate and the like.

Out of these, diphenyl carbonate is preferred from the viewpoints of reactivity, stability against the color of the obtained resin and cost.

When diphenyl carbonate and a compound obtained by substituting diphenyl carbonate with alkoxy carbonyl such as di(2-alkoxycarbonylphenyl)carbonate are used in combination as carbonic acid diester components, the polycarbonate having a specific integrated intensity of a specific signal in the $^1$H-NMR spectrum of the present invention can be advantageously obtained though the details of a chemical reaction are unknown.

Preferred examples of the di(2-alkoxycarbonylphenyl) carbonate include di(2-methoxycarbonyl-phenyl)carbonate, di(2-ethoxycarbonyl-phenyl)carbonate and the like.

It is disclosed by JP-A 61-87724 and JP-A 61-87725 that a terminal hydroxy group exerts a bad influence upon the heat resistant stability of a polycarbonate. Various methods for reducing the number of polycarbonate terminal OH groups are proposed ardently for a melt polymerization method or solid-phase polymerization method in which a large number of terminal hydroxyl groups are essentially existent in the molecule owing to the characteristics of a polymer production process. However, it is also well known that there are limits to the reduction of the number of OH terminal groups.

In contrast to this, since the polycarbonate of the present invention comprises a structural component having a specific chemical shift and integrated intensity for the signal of the $^1$H-NMR spectrum, it has excellent heat resistant stability without drastically reducing the amount of terminal OH groups.

Further, in a preferred embodiment for attaining the object of the present invention, the amount of the terminal hydroxyl group of the polycarbonate of the present invention is at least 100 chemical equivalents or less, preferably 80 chemical equivalents or less, more preferably 3 to 60 chemical equivalents, particularly preferably 5 to 50 chemical equivalents based on 1 ton of the polymer. Fewer OH terminals groups are more preferred. However, it is extremely difficult to reduce the amount of the OH terminal group to 5 chemical equivalents or less based on 1 ton of the polymer according to the industrial technical standard in the polycarbonate having a target molecular weight.

The amount of the OH terminal group can be inevitably reduced to the above range by a terminal capping agent used as a molecular weight modifier in a phosgene method. In a melt polymerization method or solid-phase polymerization in which a large number of OH terminal groups are formed owing to the characteristics of a reaction process, a special OH terminal group reduction means must be taken to reduce the amount of the OH terminal group to the above range.

For example, the molar ratio of polymerization raw materials charged is controlled. More specifically, the molar ratio of a carbonic acid diester/an aromatic dihydroxy compound when they are charged into a polymerization reactor is set to 1.03 to 1.10, taking the characteristics of the polymerization reactor into account, to carry out polymerization. Alternatively, OH terminal groups are capped by a salicylic acid ester at completion of the polymerization reaction in accordance with a method disclosed by U.S. Pat. No. 5,696,222.

The amount of the salicylic acid ester used is preferably 0.8 to 10 mols, more preferably 0.8 to 5 mols, particularly preferably 0.9 to 2 mols based on 1 chemical equivalent of the terminal OH group before a capping reaction. By adding the salicylic acid ester in that amount, 80% or more of the terminal OH groups can be advantageously capped. Catalysts disclosed by the above patent are preferably used to carry out the capping reaction.

Illustrative examples of the salicylic acid ester include 2-methoxycarbonylphenyl-phenyl carbonate, 2-methoxycarbonylphenyl-2'-methylphenyl carbonate, 2-methoxycarbonylphenyl-4'-ethylphenyl carbonate, 2-methoxycarbonylphenyl-3'-butylphenyl carbonate, 2-methoxycarbonylphenyl-4'-dodecylphenyl carbonate, 2-methoxycarbonylphenyl-4'-hexadecylphenyl carbonate, 2-methoxycarbonylphenyl-2',4'-dibutylphenyl carbonate, 2-methoxycarbonylphenyl-dinonylphenyl carbonate, 2-methoxycarbonylphenyl-cyclohexylphenyl carbonate, 2-methoxycarbonylphenyl-biphenyl carbonate, 2-methoxycarbonylphenyl-cumylphenyl carbonate and the like.

A polymerization catalyst and a co-catalyst are used to accelerate the rate of polymerization in the first production method of the present invention. A catalyst used as the polymerization catalyst consists of (i) an alkali metal compound and (ii) a nitrogen-containing basic compound and/or a phosphorus-containing basic compound, from the viewpoint of having heat stability or large polymerization rate.

The alkali metal compound used as a catalyst in the present invention is a hydroxide, hydrogencarbonate, carbonate, acetate, nitrate, nitrite, sulfite, cyanate, thiocyanate, stearate, borohydride, benzoate, hydrogenphosphate, bisphenol salt or phenol salt of an alkali metal.

Illustrative examples of the alkali metal compound include sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, cesium carbonate, sodium acetate, potassium acetate, lithium acetate, sodium nitrate, potassium nitrate, rubidium nitrate, lithium nitrate, sodium nitrite, potassium nitrite, rubidium nitrite, lithium nitrite, sodium sulfite, potassium sulfite, lithium sulfite, sodium cyanate, potassium cyanate, lithium cyanate, sodium thiocyanate, potassium thiocyanate, lithium thiocyanate, cesium thiocyanate, sodium stearate, potassium stearate, lithium stearate, cesium stearate, sodium borohydride, potassium borohydride, lithium borohydride, sodium tetraphenylborate, sodium benzoate, potassium benzoate, lithium benzoate, disodium hydrogenphosphate, dipotassium hydrogenphosphate, dilithium hydrogenphosphate, disodium salts, dipotassium salts, dilithium salts, monosodium salts, monopotassium salts, sodium potassium salts and sodium lithium salts of bisphenol A, sodium salts, potassium salts and lithium salts of phenol, and the like.

A nitrogen-containing basic compound and/or a phosphorus-containing basic compound are/is further used as a catalyst.

Illustrative examples of the nitrogen-containing basic compound include ammonium hydroxides having an alkyl, aryl or alkylaryl group such as tetramethylammonium hydroxide, tetraethylammonium hydroxide, tetrabutylammonium hydroxide, benzyltrimethylammonium hydroxide and hexadecyltrimethylammonium hydroxide, basic ammonium salts having an alkyl, aryl or alkylaryl group such as tetramethylammonium acetate, tetraethylammonium phenoxide, tetrabutylammonium carbonates, benzyltrimethylammonium benzoates and hexadecyltrimethylammonium ethoxide, tertiary amines such as triethylamine, tributylamine, dimethylbenzylamine and hexadecyldimethylamine, and basic salts such as tetramethylammonium borohydride, tetrabutylammonium borohydride, tetrabutylammonium tetraphenyl borate and tetramethylammonium tetraphenyl borate.

Illustrative examples of the phosphorus-containing basic compound include phosphonium hydroxides having an alkyl, aryl or alkylaryl group such as tetramethylphosphonium hydroxide, tetraethylphosphonium hydroxide, tetrabutylphosphonium hydroxide, benzyltrimethylphosphonium hydroxide and hexadecyltrimethylphosphonium hydroxide; and basic salts such as tetramethylphosphonium borohydride, tetrabutylphosphonium borohydride, tetrabutylphosphonium tetraphenyl borate and tetramethylphosphonium tetraphenyl borate.

As to the amount of the polymerization catalyst used in the present invention, the alkali metal compound is $1 \times 10^{-7}$ to $1 \times 10^{-5}$ chemical equivalent based on 1 mol of the aromatic dihydroxy compound and the amount of the nitrogen-containing basic compound and/or the phosphorus-containing basic compound is $5 \times 10^{-5}$ to $1 \times 10^{-3}$ chemical equivalent based on 1 mol of the aromatic dihydroxy compound to limit the content of a specific component to a specific range.

The equivalent of the alkali metal compound as used herein means the product of the total number of valences of alkali metal elements contained in 1 molecule of the catalyst and the number of mols of the catalyst. When one alkali metal element (monovalent) is contained in 1 molecule of the catalyst, 1 mol of the catalyst is equal to 1 equivalent to the catalyst and when 2 alkali metal elements (monovalent) are contained in 1 molecule of the catalyst, 1 mol of the catalyst is equal to 2 equivalents of the catalyst.

When the amount of the catalyst is below the above range, the catalyst may exert a bad influence upon the physical properties of the obtained polycarbonate or an ester exchange reaction does not proceed fully, whereby a polycarbonate having a desired molecular weight cannot be obtained disadvantageously. When the amount of the catalyst is above the range, the content of a specific component exceeds a specific range disadvantageously.

A sulfur-containing compound is used as a co-catalyst in the present invention. Any sulfur-containing compound may be used without restriction if it contains a sulfur atom in the molecule. Sulfur-containing organic compounds are preferred. Out of these, thiols, thiocyanates, isothiocyanates, thioesters, thioethers, thiocarbonates, thioureas and disulfides are particularly preferred.

The sulfur-containing compound may be an aromatic compound or aliphatic compound. It is preferably an aliphatic compound because it easily obtain effects as the object of the present invention. Out of aliphatic sulfur-containing compounds, what have a boiling point or thermal decomposition point at normal pressure of 100 to 300° C. are more preferred.

Thiols include aliphatic thiols such as methanethiol, ethanethiol, propanethiol, butanethiol, 1,2-butanedithiol, 1,4-butanedithiol, octanethiol, decanethiol, octanedithiol, dodecanethiol, 1,10-dodecanedithiol, stearyl mercaptan, docosanethiol, cyclopentyl mercaptan, cyclohexanethiol, 1,4-cyclohexanedithiol, 1,3,5-cyclohexanetrithiol and 4-pentene-1-thiol; and aromatic thiols such as benzenethiol, naphthalenethiol, biphenylthiol and 1,4-phenylenedithiol. Thiols containing different functional groups such as an ester group, ether group, carboxyl group and amino group may be used as desired. The thiols include metal salts of 2-mercaptopropionic acid, 3-mercaptopropionic acid ethyl ester, butylthioglycolate, 16-mercaptododecanoic acid, bis(2-mercaptoethyl)ether, L-cysteine, L-cysteineethyl ester and L-cysteinebutyl ester, 2-mercaptoimidazole and the like.

Thiocyanates include aliphatic thiocyanates such as methane thiocyanate, ethane thiocyanate, ethylene dithiocyanate, propane thiocyanate, butane thiocyanate, butane dithiocyanate, 1,4-butane dithiocyanate, octanethiocyanate, docosanethiocyanate, octanedithiocyanate, 1,10-decanedithiocyanate, docosanedithiocyanate, hexacosanethiocyanate, cyclohexanethiocyanate and 1,4-cyclohexanedithiocyanate; and aromatic thiocyanates such as benzene thiocyanate, naphthalene thiocyanate, 1,4-phenylene dithiocyanate and benzyl thiocyanate. Thiocyanates containing different functional groups such as an ester group and ether group may be used as desired. The thiocyanates include 2-ethoxyethane thiocyanate, 4-methoxycarbonylbenzene thiocyanate and the like.

Isothiocyanates include aliphatic isothiocyanates such as methane isothiocyanate, ethane isothiocyanate, ethane diisothiocyanate, propane isothiocyanate, butane isothiocyanate, butane diisothiocyanate, 1,4-butane diisothiocyanate, octaneisothiocyanate, docosaneisothiocyanate, octanediisothiocyanate, docosanediisothiocyanate, cyclohexane isothiocyanate and 1,4-cyclohexane diisothiocyanate; and aromatic isothiocyanates such as benzene isothiocyanate, naphthalene isothiocyanate and 1,4-phenylene diisothiocyanate. Isothiocyanates having different functional groups such as an ester group and ether group may be used as desired. The isothiocyanates include 2-ethoxybutane isothiocyanate, 4-phenoxyphenyl isothiocyanate and the like.

Thioesters include aliphatic thioesters such as propionic acid ethylthioester and γ-thiobutyrolactone; and aromatic thioesters such as benzoic acid methyl thioester. Thioesters containing different functional groups such as an ether group may be used as desired. The thioesters include 2-methoxypropionic acid ethyl thioester, t-butyl-S-(4,6-dimethylpyrimidine-2-yl) and the like.

Thioethers include aliphatic thioethers such as dimethyl sulfide, diethyl sulfide, dibutyl sulfide, di-n-hexyl sulfide, butyloctyl sulfide, trimethylene sulfide, pentamethylene sulfide, 1,3,5-trithiane, 1,3-dithiolan, 1,4,7-trithiacyclodecane and 1,4,7-trithiacyclononane; and aromatic thioethers such as 1,3-bis(phenylthio)propane, diphenyl sulfide, dibenzyl sulfide, dinaphthyl sulfide and bis(2,4-di-n-propylphenyl)sulfide. Thioethers containing different functional groups such as an ester group, ether group, carboxyl group and amino group may be used as desired. The thioethers include 4-ethoxy-n-butyl-hexylthioether, methylmethyl thioacetate, thiomorpholine, 1,4-thioxane, bis(4-methoxycarbonylphenyl)sulfide, 3-butylthiopropionic acid, 2-ethylthiobenzoic acid, 4-butylthiohexylamine, 3-methylthiophenylamine, bis(4-ethoxybenzyl)sulfide and the like.

Thiocarbonates include aliphatic thiocarbonates such as diethyl thiocarbonate, dibutyl thiocarbonate and dimethyl trithiocarbonate; and aromatic thiocarbonates such as diphenyl thiocarbonate. Thiocarbonate containing different functional groups such as an ester group and ether group may be used as desired. The thiocarbonates include bis(2-ethoxyethyl)thiocarbonate, bis(2-acetylethyl)thiocarbonate and the like.

Thioureas include aliphatic thioureas such as thiourea, 1-methyl-2-thiourea, 1,3-diethyl-2-thiourea, 1,3-dibutyl-2-thiourea, 1,3-diisopropyl-2-thiourea and dicyclohexylthiourea; and aromatic thioureas such as 1,3-diphenyl-2-thiourea. Thioureas containing different functional groups such as an ester group, ether group and amino group may be used as desired. The thioureas include 4-methoxycarbonylphenyl-3-phenyl-2-thiourea, 4-phenoxyphenyl-3-phenylthiourea, 2-thiohydantoin, 1,1-thiocarbonylimidazole, 1-cyclohexyl-3-(2-morpholinoethyl)-2-thiourea and the like.

Disulfides include aliphatic disulfides such as dimethyl disulfide, diethyl disulfide, dibutyl disulfide, di-n-hexyl disulfide and butyloctyl disulfide; and aromatic disulfides such as diphenyl disulfide, dibenzyl disulfide, dinaphthyl disulfide and bis(2,4-di-n-propylphenyl)disulfide. Disulfides having different functional groups such as an ester group, ether group, carboxyl group and amino group may be used as desired. The disulfides include 4-ethoxybutylhexyl disulfide, bis(4-methoxycarbonylphenylmethyl)disulfide, S-methylthiocysteine, cystine and the like.

Out of these sulfur compounds, octanethiol, trithiane and thiourea are preferred. These compounds may be used alone or in combination.

The above sulfur compound is used in an amount of 0.1 to 100 sulfur atoms based on 1 atom of an alkali metal of an alkali metal compound as a catalyst.

The sulfur compound is more preferably used in an amount of 0.3 to 80 sulfur atoms, much more preferably 1 to 50 sulfur atoms based on the same standard.

The time of adding the sulfur-containing compound is not particularly limited but preferably from before an ester exchange reaction to the initial stage of the ester exchange reaction. It is more preferred to add the sulfur-containing compound together with an alkali metal compound as a catalyst. An apparatus used for addition and a material therefor are not particularly limited.

In the present invention, to obtain a polycarbonate suited for the production of thin melt moldings, what has a melt viscosity stability after polymerization of 0.5% or less is preferably used. To set the melt viscositystability of the polycarbonate to 0.5% or less, a specific amount of a melt viscosity stabilizer is added to a polycarbonate after a polycondensation reaction, preferably after the end of a terminal capping reaction. A polycarbonate having low melt viscosity stability is hardly put to practical use because it has low stability at the time of molding and low stability of mechanical properties, especially a drastic reduction in impact resistance, when its moldings are used at high humidity or for a long time.

The melt viscosity stability is evaluated by an absolute value of change in melt viscosity measured under a nitrogen atmosphere at a shearing speed of 1 rad/sec and 30° C. for 30 minutes and expressed by change rate per minute.

The melt viscosity stabilizer used in the present invention serves to deactivate part or all of the activity of a polymerization catalyst used at the time of producing a polycarbonate.

As for the addition of the melt viscosity stabilizer, for example, it may be added while a polycarbonate as a reaction product is molten or after a polycarbonate is pelletized and re-molten. In the former, it may be added while the polycarbonate as a reaction product in a reactor or extruder is molten, or a deactivator may be added and kneaded while the polycarbonate obtained after polymerization is pelletized from a reactor through an extruder.

Any known melt viscosity stabilizer may be used, as exemplified by tetrabutylphosphonium octylsulfonate, tetrabutylphosphonium decylsulfonate, tetramethylphosphonium benzene sulfonate, tetrabutylphosphonium benzene sulfonate, tetrabutylphosphonium dodecylbenzene sulfonate, tetrahexylphosphonium dodecylbenzene sulfonate, tetraoctylphosphonium dodecylbenzene sulfonate, tetramethylammonium decylsulfonate, tetraethylammonium benzene sulfonate, tetrabutylammonium dodecylbenzene sulfonate, methylbenzene sulfonate, ethylbenzene sulfonate, butylbenzene sulfonate, octylbenzene sulfonate, phenylbenzene sulfonate, methyl p-toluene sulfonate, ethyl p-toluene sulfonate, butyl p-toluene sulfonate, octyl p-toluene sulfonate, phenyl p-toluene sulfonate, methyl dodecylsulfonate, ethyl hexadecyl sulfonate, propylnonyl sulfonate, butyl decylsulfonate and the like.

Out of these, sulfonic acid compounds such as organic sulfonic acid salts, organic sulfonic acid esters, organic sulfonic anhydrides and organic sulfonic acid betaines are preferred and phosphonium salts of sulfonic acid and/or ammonium salts of sulfonic acid are more preferred because they have the large effect of improving the physical properties such as color, heat resistance and boiling water resistance of a polycarbonate. Out of these, tetrabutylphosphonium dodecylbenzene sulfonate and tetrabutylammonium p-toluene sulfonate are particularly preferred.

The polycarbonate having excellent heat resistant stability of the present invention can be obtained by the abovemethod. A conventionally known processing stabilizer, heat resistant stabilizer, antioxidant, ultraviolet light absorber, antistatic agent, flame retardant, release agent, colorant and the like may be added according to application purpose to form various moldings from the polycarbonate. In this case, if the above additives have a signal at the same ranges as the above four chemical shift ranges in the above $^1$H-NMR spectrum for specifying the polycarbonate of the present invention, the heat resistant stability improving effect of the additives is irrelevant to the heat resistant stability improving effect of the polycarbonate of the present invention.

A heat stabilizer may be mixed to prevent a reduction in the molecular weight of the polycarbonate of the present invention and deterioration in the color of the polycarbonate of the present invention. Examples of the heat stabilizer include phosphorous acid, phosphoric acid, phosphinous acid, phosphonic acid and esters thereof. For example, trisnonylphenyl phosphite, tris(2,4,-di-tert-butylphenyl) phosphite, 4,4'-biphenylene diphosphonic acid tetrakis(2,4-di-tert-butylphenyl), 4,4'-trimethylphosphate and dimethyl benzene phosphonate are preferably used. These heat stabilizers may be used alone or in combination of two or more. The amount of the heat stabilizer is preferably 0.0001 to 1 part by weight, more preferably 0.0005 to 0.5 part by weight, much more preferably 0.001 to 0.1 part by weight based on 100 parts by weight of the polycarbonate of the present invention.

To further improve releasability from a metal mold at the time of melt molding, a release agent may be mixed with the polycarbonate of the present invention in limits that do not impair the object of the present invention. Examples of the release agent include olefin-based wax, olefin-based wax containing a carboxyl group and/or carboxylic anhydride group, silicone oil, organopolysiloxane, higher fatty acid esters of monohydric and polyhydric alcohols, paraffin wax, beeswax and the like. The amount of the release agent is preferably 0.01 to 5 parts by weight based on 100 parts by weight of the polycarbonate of the present invention.

Out of the higher fatty acid esters, a partial ester or whole ester of a monohydric or polyhydric alcohol having 1 to 20 carbon atoms and a saturated fatty acid having 10 to 30 carbon atoms is preferred. Preferred examples of the partial ester or whole ester of a monohydric or polyhydric alcohol and a saturated fatty acid include glycerin monostearate, triglyceride glycerin stearate and pentaerythritol tetrastearate. The amount of the release agent is preferably 0.01 to 5 parts by weight based on 100 parts by weight of the polycarbonate of the present invention.

The above additives specified by the present invention and the polycarbonate of the present invention can be produced by mixing the above additive compositions by a desired means such as a tumbler, blender, cone screw-type mixer, Banbury mixer, kneading roll, extruder or the like.

A description is subsequently given of the second production method of the present invention. It should be understood that the above description of the first production method of the present invention can be applied to what is not described of the second production method herein directly or with modifications obvious to one of ordinary skill in the art.

The second production method of the present invention is carried out by polycondensing an aromatic dihydroxy compound comprising mainly bisphenol A and a carbonic acid diester in the presence of as an ester exchange catalyst, an alkali metal compound and a nitrogen-containing basic compound and/or a phosphorus-containing basic compound and a C-radical scavenger.

Preferred examples of the C-radical scavenger include silanes represented by the following formula (A):

$$R^1R^2R^3SiH \qquad (A)$$

wherein $R^1$, $R^2$ and $R^3$ are each independently a hydrogen atom, alkyl group having 1 to 30 carbon atoms, alkoxyl group having 1 to 20 carbon atoms or aryl group having 6 to 20 carbon atoms which may be substituted, or silanes represented by the following formula (A)-1:

$$-O-SiY^1Y^2Y^3 \qquad (A)\text{-}1$$

wherein $Y^1$, $Y^2$ and $Y^3$ are each independently a hydrogen atom, alkyl group having 1 to 20 carbon atoms, alkoxyl group having 1 to 10 carbon groups or aryl group having 6 to 20 carbon atoms which may be substituted, an acrylate represented by the following formula (B):

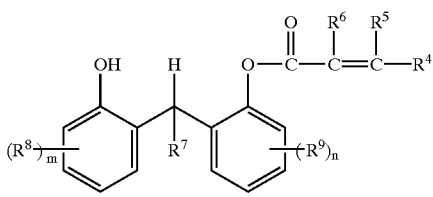

wherein $R^4$ and $R^5$ are each independently a hydrogen atom or alkyl group having 1 to 6 carbon atoms, $R^6$ is a hydrogen atom or methyl group, $R^7$ is a hydrogen atom, alkyl group having 1 to 6 carbon atoms or aryl group having 6 to 10 carbon atoms, $R^8$ and $R^9$ are each independently an alkyl group having 1 to 10 carbon atoms, and m and n are 0, 1 or 2, and a lactone-based stabilizer represented by the following formula (C):

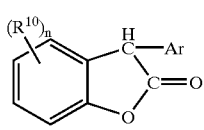

wherein $R^{10}$ is an alkyl group having 1 to 10 carbon atoms, n is an integer of 0 to 3, and Ar is an aromatic group having 6 to 20 carbon atoms which may be substituted.

The definition, function and the like of the C-radical scavenger are described in "Stabilization of Polymeric Materials" written by Hans Zweifel, items 2, 1, 2, 5, page 52.

The amount of the C-radical scavenger is preferably 0.0001 to 5 parts by weight, more preferably 0.0005 to 3 parts by weight, much more preferably 0.001 to 1 part by weight, particularly preferably 0.001 to 0.5 part by weight based on 100 parts by weight of the polycarbonate.

When the amount of the C-radical scavenger is smaller than 0.0001 part by weight, its effect of reducing the formation of gel foreign matter and its effect of improving moist heat resistance and color stability are hardly obtained and when the amount is larger than 5 parts by weight, it often exerts a bad influence upon the color, transparency and mechanical properties of the obtained polycarbonate.

In the present invention, when the C-radical scavenger is used to maintain its relationship with the amount of terminal OH groups which is represented by the following formula (I), its effect is large advantageously.

$$\log[OH] + 10 \leq \log(a) \leq \log[OH] + 3 \qquad (I)$$

wherein [OH] is the amount of the terminal OH group of the polycarbonate (eq/ton) and (a) is the amount of the C-radical scavenger added (ppm).

Examples of the silanes represented by the above formula (A) include phenyldimethoxysilane, phenyldimethylsilane, benzyldimethylsilane, 1,2-bis(dimethylsilyl)benzene, 1,4-bis(dimethylsilyl)benzene, bis[(p-dimethylsilyl)phenyl] ether, bis(trimethylsiloxy)ethylsilane, bis(trimethylsiloxy) methylsilane, t-butyldimethylsilane, di-t-butylmethylsilane, di-t-butylsilane, dimethylethoxysilane, diphenylmethylsilane, diphenylsilane, ethylbis(trimethylsiloxy)silane, ethyldimethylsilane, hexylsilane, methyldiethoxysilane, methyltris(dimethylsiloxy)silane, n-octadecylsilane, n-octylsilane, pentamethylcyclopentasiloxane, phenyldiethoxysilane, phenyldimethylsilane, phenylmethylsilane, phenylsilane, tetraethylcyclotetrasiloxane, 1,3,5,7-tetramethylcyclotetrasiloxane, 1,1,4,4-tetramethyldisilylethylene, tri-t-butylsilane, triethoxysilane, triethylsilane, tri-n-hexylsilane, triisobutylsilane, triisopropoxysilane, triisopropylsilane, triphenylsilane and the like.

Examples of the acrylate represented by the above formula (B) include 2-t-butyl-6-(3-t-butyl-2-hydroxy-5-methylbenzyl)-4-methylphenyl acrylate, 2-t-pentyl-6-(3-t-pentyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 2-[1-(2-hydroxy-3,5-di-t-butylphenyl)ethyl]-4,6-di-t-butylphenyl acrylate, 2-[1-(2-hydroxy-3-t-butyl-5-methylphenyl)ethyl]-4-methyl-6-t-butylphenyl acrylate, 2-[1-(2-hydroxy-3-t-pentyl-5-methylphenyl)ethyl]-4-methyl-6-t-pentylphenyl acrylate, 2,4-di-t-pentyl-6-(3,5-di-t-pentyl-2-hydroxy-benzyl)phenyl acrylate, 2,4-di-t-butyl-6-(3,5-di-t-butyl-2-hydroxy-benzyl)-phenyl acrylate and the like.

It is understood that the second production method of the present invention is a method in which the above C-radical scavenger is used in place of the sulfur-containing compound used in the first production method.

A description is subsequently given of the third production method of the present invention. It should be understood that the above description of the first production method of the present invention can be applied to what is not described of the third production method herein directly or with modifications obvious to one of ordinary skill in the art.

The third production method of the present invention is carried out by polycondensing an aromatic dihydroxy compound comprising mainly bisphenol A in the form of an orthorhombic crystal and a carbonic acid diester using in the presence of, as an ester exchange catalyst, an alkali metal compound and a nitrogen-containing basic compound and/or a phosphorus-containing basic compound.

In the third production method, the orthorhombic bisphenol A is used as bisphenol A.

A monoclinic system is known as the crystal structure of bisphenol A, that is, 2,2-bis(4-hydroxyphenyl)propane, in addition to an orthorhombic system. The inventors of the present invention have found that when 2,2-bis(4-hydroxyphenyl)propane having an orthorhombic crystal structure is used, the obtained polycarbonate has excellent color.

The definite reason why the color of the obtained polymer becomes excellent when orthorhombic 2,2-bis(4-hydroxyphenyl)propane is used is unknown. The present inventors presume that there is a difference in surface activity for adsorbing crystal impurities between the orthorhombic system and the monoclinic system.

Methods of obtaining orthorhombic 2,2-bis(4-hydroxyphenyl)propane include one in which 2,2-bis(4-hydroxyphenyl)propane is purified by fractional melting crystallization and one in which a crystal adduct of 2,2-bis (4-hydroxyphenyl)propane is obtained, decomposed and purified.

In the third production method of the present invention, a co-catalyst consisting of a sulfur-containing compound used in the first production method of the present invention or a C-radical scavenger used in the second production method of the present invention does not always need to be used.

The thus produced aromatic polycarbonate of the present invention specified by the specific signal in the above $^1$H-NMR spectrum can be formed into various moldings such as films and sheets. It can be particularly advantageously used as a substrate for optical recording media such as optical disks including CDs and DVD-RAMs.

EXAMPLES

The following examples are provided for the purpose of further illustrating the present invention but are in no way to be taken as limiting. Physical properties were measured in accordance with the following methods in the present invention.

1) Intrinsic Viscosity [η]

This is measured in methylene chloride at 20° C. by an Ubbelohde's viscometer.

2) Color of Polymer

The b value of a polymer chip is measured by the ND-1001DP color difference meter of Nippon Denshoko Kogyo Co., Ltd.

3) Melt Viscosity Stability

This is measured under a nitrogen air stream at a shearing speed of 1 rad/sec and a temperature of 300° C. using the RAA fluidity analyzer of Rheometrics Co., Ltd. After melt viscosity becomes stable 5 minutes after the start of measurement, the absolute value of change in melt viscosity is measured for 30 minutes to obtain a change rate per minute.

This value does not exceed 1% for the purpose of a polycarbonate resin composition having excellent long-term stability. It is preferably 0.5% or less.

When this value is large, an excellent molded product cannot be obtained due to a change in resin viscosity at the time of melt molding and the long-term stability of the molded product becomes low.

4) Formation of Gel 10 g of a polymer is kept at 280° C. under a nitrogen gas atmosphere for 24 hours. The obtained sample is dissolved in 2 liters of methylene chloride, the obtained solution is filtered with a 10 pm filter, and the number of gel foreign substances on the filter (which are left after what are judged as foreign matter from the outside of a reaction system, such as protein and cotton yarn, by FT-IR measurement are removed from what emit fluorescence under illumination with black light having a wavelength of 365 nm) is counted. Filtration and measurement are carried out 10 times for each polymer and a mean value of measurement data is used. A polymer containing 100 or less gel foreign substances is judged as accepted.

5) Long-term Stability of Molded Product 10 plates measuring 50 mm×50 mm×5 mm which are molded by the Neomat N150/75 injection molding machine of Sumitomo Heavy Industries, Ltd. at a cylinder temperature of 280° C. and a molding cycle of 3.5 seconds are exposed to a temperature of 85° C. and a relative humidity of 90% for 12 hours and a temperature of 0° C. and a relative humidity of 90% for 12 hours each day in a high-temperature and high-humidity tank for 20 days. The number of fine defects which shine when illuminated with light and are contained in the sample is counted by the eye. When the sample has 10 or more defects, it is judged as NG.

6) $^1$H-NMR Measurement 20 mg of a polycarbonate resin is dissolved in 0.5 ml of heavy chloroform containing 0.3% of tetramethylsilane as an internal reference and the $^1$H-NMR spectrum of the obtained solution is measured 10,000 times by the JEOLNM-270 of JEOL Ltd. The total integrated intensity of signals detected at four specific ranges: component A: δ=2.14 to 2.17 ppm, component B; δ=3.62 to 3.69 ppm, component C; δ=3.46 to 3.49 ppm and component D; δ=5.42 to 5.46 ppm is measured to obtain the ratio of the total integrated intensity to the intensity of a signal derived from a methyl group contained in the main chain of the polycarbonate detected at a range of δ=1.50 to 2.00 ppm in the spectrum.

7) Conditions for Forming Molded Pieces and Evaluation of Moldability

Each polycarbonate composition produced in production examples is molded by the DM-50B injection molding machine of Meiki Co., Ltd., using a metal mold for molding a ASTM-D638-based breaking elongation test piece which is a molded product consisting of a 3 mm thick and 50 mm diameter disk plate and a rectangular plate measuring 5 mm (thickness)×120 mm (length) and 12 mm (width) at a cylinder temperature of 380° C. (molded plate-a). 100 shots are continuously molded. If the number of shots which cannot be released from the mold due to the fragility of the polymer is 0 to 5, moldability is evaluated as excellent and if the number of shots is 6 or more, moldability is judged as poor.

A molded plate (molded plate-b) is formed in the same manner as the molded plate-a after the temperature of 380° C. is maintained for 10 minutes in the cylinder of the same injection molding machine.

8) Conditions for Forming Molded Pieces and Heat Resistance Test

The breaking elongation of the molded breaking elongation test piece is evaluated in accordance with ASTM-D638. 10 test pieces are prepared for each specimen, the state of each test piece is adjusted at 23° C.±2° C. and 50±5% RH for 50 hours, measurement is made under the same atmosphere as above, and breaking elongation is evaluated based on a mean value. The larger the value of breaking elongation the stronger the molded product is and the smaller the breaking elongation retention (R) before and after the heat resistance treatment (molded plates-a and b) the higher the heat resistance of the polymer becomes.

$$R = E2/E1 \times 100\ (\%)$$

E1: breaking elongation of molded plate-a
E2: breaking elongation of molded plate-b
When the breaking elongation retention R is 50% or more, mechanical strength stability by heat is evaluated as excellent.

Examples 1, 2 and 4

137 parts by weight of 2,2-bis(4-hydroxyphenyl)propane, 135 parts by weight of carbonic acid diphenyl, $2 \times 10^{-4}$ part by weight of a bisphenol A disodium salt and $5 \times 10^{-3}$ part by weight of tetramethylammonium hydroxide as polymerization catalysts and a co-catalyst or radical scavenger shown in Table 1 were charged into a reactor equipped with a stirrer, fractionating column and decompression device, the inside of the reactor was substituted with nitrogen, and these substances were dissolved at 180° C.

A reaction was carried out under agitation at an inner pressure of 100 mmHg for 30 minutes and the formed phenol was distilled off. The reaction was further carried out by increasing the inside temperature to 200° C. and gradually reducing the pressure to 50 mmHg for 30 minutes while the formed phenol was distilled off. The reaction was further continued by gradually increasing the temperature to 220° C. and reducing the pressure to 30 mmHg, maintaining that temperature and pressure for 30 minutes, and increasing the temperature and reducing the pressure to 240° C. and 10 mmHg, 260° C. and 1 mmHg and 270° C. and 1 mmHg or less in the same manner as described above.

Finally, a polymer having a viscosity average molecular weight of 15,300 was obtained by continuing a polymerization reaction at the same temperature and the same pressure and sampling part of a polymer to measure viscosity average molecular weight when the viscosity average molecular weight of a polycarbonate became 15,300, judged by the agitation power of the polymerization reactor.

Thereafter, $2 \times 10^{-3}$ part by weight of tetrabutylphosphonium dodecylbenzene sulfonate was added and stirred at the same temperature and the same pressure for 10 minutes, and the resulting product was pelletized.

Example 3

A polycarbonate was obtained in the same manner as in Example 2 and pelletized except that the radical scavenger shown in Table 1 was not added at the time of charging raw materials but added and kneaded to a polymer after polymerization by a vented double-screw extruder while it was degassed at a cylinder temperature of 240° C.

Example 5

A polycarbonate was obtained in the same manner as in Examples 1, 2 and 4 and pelletized except that 2,2-bis(4-hydroxyphenyl)propane having an orthorhombic system was used as a polymer raw material and a co-catalyst or radical scavenger was not added.

Example 6

A polycarbonate having a viscosity average molecular weight of 22,500 was obtained in the same manner as in example 2 and pelletized by continuing a polymerization reaction at the same temperature and the same pressure finally and sampling part of a polymer to measure viscosity average molecular weight when the viscosity average molecular weight of the polycarbonate became 22,500, judged by the agitation power of a polymerization reactor.

"A" in the table denotes a compound having the following structure.

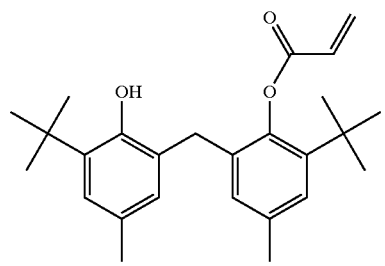

TABLE 1

|  | co-catalyst | radical scavenger | methyl group | integrated intensity of NMR signal |  |  |  |
|---|---|---|---|---|---|---|---|
|  |  |  |  | component component A | component B | component C | component D |
| Ex. 1 | $1 \times 10^{-3}$ part by weight of trithiane | — | 600 | 1.38 | 0.90 | 0.48 | 0.03 |
| Ex. 2 | — | $5 \times 10^{-2}$ part by weight of ris(trimethylsilyl)silane | 600 | 0.53 | 0.00 | 0.06 | 0.00 |
| Ex. 3 | — | $5 \times 10^{-2}$ part by weight of tris(trimethylsilyl)silane | 600 | 0.42 | 0.00 | 0.00 | 0.00 |
| Ex. 4 | — | A $5 \times 10^{-2}$ part by weight | 600 | 0.23 | 0.10 | 0.03 | 0.00 |
| Ex. 5 | — | — | 600 | 0.20 | 0.20 | 0.09 | 0.01 |
| Ex. 6 | — | $5 \times 10^{-2}$ part by weight of tris(trimethylsilyl)silane | 600 | 1.01 | 0.00 | 0.13 | 0.00 |

|  | ratio of integrated intensity of each specific component to component derived from methyl group | | | | | b value of polymer | viscosity average molecular weight | number of gels | number of defects in molded product | moldability number of failure shots |
|---|---|---|---|---|---|---|---|---|---|---|
|  | component A | component B | component C | component D | total | | | | | |
| Ex. 1 | 0.23 | 0.15 | 0.08 | 0.01 | 0.47 | 2.5 | 15300 | 80 | 5 | 1 |
| Ex. 2 | 0.09 | 0.00 | 0.01 | 0.00 | 0.10 | 2.5 | 15300 | 75 | 1 | 1 |
| Ex. 3 | 0.07 | 0.00 | 0.00 | 0.00 | 0.07 | 3 | 15300 | 45 | 5 | 0 |
| Ex. 4 | 0.04 | 0.02 | 0.01 | 0.00 | 0.06 | 2.5 | 15300 | 75 | 5 | 1 |
| Ex. 5 | 0.20 | 0.20 | 0.09 | 0.01 | 0.50 | 2.4 | 15300 | 80 | 5 | 1 |
| Ex. 6 | 0.17 | 0.00 | 0.02 | 0.00 | 0.19 | 3.2 | 22500 | 85 | — | — |

|  | breaking elongation (%) | | breaking before and after heat resistance test |
|---|---|---|---|
|  | no heat resistance test | after heat resistance test | elongation retention |
| Ex. 1 | 95% | 48% | 51% |
| Ex. 2 | 95% | 50% | 53% |
| Ex. 3 | 95% | 52% | 55% |
| Ex. 4 | 95% | 49% | 52% |

TABLE 1-continued

| | | | |
|---|---|---|---|
| Ex. 5 | 95% | 50% | 53% |
| Ex. 6 | — | — | — |

Ex.: Example
(A) δ = 2.14 to 2.17 ppm
(B) δ = 3.46 to 3.49 ppm,
(C) δ = 3.62 to 3.69 ppm
(D) δ = 5.42 to 5.46 ppm

What is claimed is:

1. An aromatic polycarbonate comprising mainly a recurring unit represented by the following formula (1);

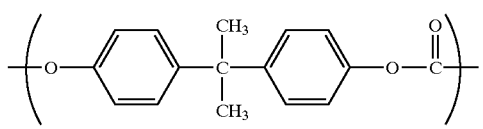

(1)

and having a percentage of the total of integrated intensities of all signals detected at four ranges, δ=2.14 to 2.17 ppm, δ=3.46 to 3.49 ppm, δ=3.62 to 3.69 ppm and δ=5.42 to 5.46 ppm to the integrated intensity of a signal derived from a methyl group detected at a range of δ=1.50 to 2.00 ppm of 0.01 to 2.0% in its $^1$H-NMR spectrum in heavy chloroform and a viscosity average molecular weight of 10,000 to 100,000.

2. The aromatic polycarbonate of claim 1, wherein the recurring unit represented by the above formula (1) accounts for at least 80 mol % of the total of all the recurring units.

3. The aromatic polycarbonate of claim 1, wherein the integrated intensity of a signal detected at δ=2.14 to 2.17 ppm is 0 to 1.5%, the integrated intensity of a signal detected at δ=3.46 to 3.49 ppm is 0 to 0.9%, the integrated intensity of a signal detected at δ=3.62 to 3.69 ppm is 0 to 2.0% and the integrated intensity of a signal detected at δ=5.42 to 5.46 ppm is 0 to 0.7% of the integrated intensity of a signal derived from a methyl group detected at δ=1.50 to 2.00 ppm in the $^1$H-NMR spectrum in heavy chloroform.

4. The aromatic polycarbonate of claim 1 or 3, wherein the total of integrated intensities of all signals detected at two ranges, δ=3.46 to 3.49 ppm and δ=3.62 to 3.69 ppm, is 0.1 to 1.0% of the integrated intensity of a signal derived from a methyl group detected at δ=1.50 to 2.00 ppm in the $^1$H-NMR spectrum in heavy chloroform.

5. The aromatic polycarbonate of claim 1 which has a viscosity average molecular weight of 12,000 to 17,000.

6. The aromatic polycarbonate of claim 5, wherein the integrated intensity of a signal detected at δ=2.14 to 2.17 ppm is 0 to 0.4%, the integrated intensity of a signal detected at δ=3.46 to 3.49 ppm is 0 to 0.3%, the integrated intensity of a signal detected at δ=3.62 to 3.69 ppm is 0 to 0.2%, and the integrated intensity of a signal detected at δ=5.42 to 5.46 ppm is 0 to 0.1% of the integrated intensity of a signal derived from a methyl group detected at δ=1.50 to 2.00 ppm in the $^1$H-NMR spectrum in heavy chloroform.

7. The aromatic polycarbonate of claim 1 which has a viscosity average molecular weight of 20,000 to 30,000.

8. The aromatic polycarbonate of claim 7, wherein the integrated intensity of a signal detected at δ=2.14 to 2.17 ppm is 0 to 1.0%, the integrated intensity of a signal detected at δ=3.46 to 3.49 ppm is 0 to 0.6%, the integrated intensity of a signal detected at δ=3.62 to 3.69 ppm is 0 to 1.0%, and the integrated intensity of a signal detected at δ=5.42 to 5.46 ppm is 0 to 0.5% of the integrated intensity of a signal derived from a methyl group detected at δ=1.50 to 2.00 ppm in the $^1$H-NMR spectrum in heavy chloroform.

9. A method for preparing an aromatic polycarbonate, which comprises polycondensing an aromatic dihydroxy compound comprising mainly bisphenol A and a carbonic acid diester in the presence of, as an ester exchange catalyst, an alkali metal compound and a nitrogen-containing basic compound and/or a phosphorus-containing basic compound and, as a co-catalyst, a sulfur-containing compound, the alkali metal compound being used in an amount of $1 \times 10^{-7}$ to $1 \times 10^{-5}$ equivalent in terms of alkali metal atoms and the nitrogen-containing basic compound and/or the phosphorus-containing basic compound being used in a total amount of $5 \times 10^{-5}$ to $1 \times 10^{-3}$ equivalent in terms of nitrogen atoms and/or phosphorus atoms based on 1 mol of the aromatic dihydroxy compound, and the sulfur-containing compound being used in an amount of 0.1 to 100 atoms in terms of sulfur atoms based on 1 atom of the alkali metal of the alkali metal compound, so as to form the aromatic polycarbonate of claim 1.

10. The method of claim 9, wherein the sulfur-containing compound is at least one selected from the group consisting of thiols, thiocyanates, isothiocyanates, thioesters, thioethers, thiocarbonates, thioureas and disulfides.

11. A method for preparing an aromatic polycarbonate, which comprises polycondensing an aromatic dihydroxy compound comprising mainly bisphenol A and a carbonic acid diester in the presence of, as an ester exchange catalyst, an alkali metal compound and a nitrogen-containing basic compound and/or a phosphorus-containing basic compound and a C-radical scavenger, the alkali metal compound being used in an amount of $1 \times 10^{-7}$ to $1 \times 10^{-5}$ equivalent in terms of alkali metal atoms and the nitrogen-containing basic compound and/or the phosphorus-containing basic compound being used in a total amount of $5 \times 10^{-5}$ to $1 \times 10^{-3}$ equivalent in terms of nitrogen atoms and/or phosphorus atoms based on 1 mol of the aromatic dihydroxy compound, and the C-radical scavenger being used in an amount of 0.0001 to 5 parts by weight based on 100 parts by weight of the formed aromatic polycarbonate, so as to form the aromatic polycarbonate of claim 1.

12. The method of claim 11, wherein the C-radical scavenger is represented by the following formula (A):

$$R^1R^2R^3SiH \qquad (A)$$

wherein $R^1$, $R^2$ and $R^3$ are each independently a hydrogen atom, alkyl group having 1 to 30 carbon atoms, alkoxyl group having 1 to 20 carbon atoms, aryl group having 6 to 20 carbon atoms, or a group represented by the following formula (A)-1:

$$\text{—O—SiY}^1\text{Y}^2\text{Y}^3 \qquad (A)\text{-}1$$

wherein $Y^1$, $Y^2$ and $Y^3$ are each independently a hydrogen atom, alkyl group having 1 to 10 carbon atoms, alkoxyl group having 1 to 10 carbon atoms or aryl group having 6 to 20 carbon atoms.

13. The method of claim 11, wherein the C-radical scavenger is an acrylate represented by the following formula (B):

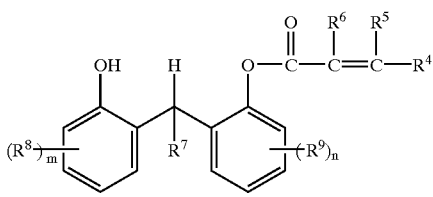

(B)

wherein $R^4$ and $R^5$ are each independently a hydrogen atom or alkyl group having 1 to 6 carbon atoms, $R^6$ is a hydrogen atom or methyl group, $R^7$ is a hydrogen atom, alkyl group having 1 to 6 carbon atoms or aryl group having 6 to 10 carbon atoms, $R^8$ and $R^9$ are each independently an alkyl group having 1 to 10 carbon atoms, and m and n are 0, 1 or 2.

14. The method of claim 11, wherein the C-radical scavenger is a lactone-based stabilizer represented by the following formula (C):

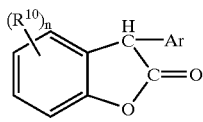

wherein $R^{10}$ is an alkyl group having 1 to 10 carbon atoms, n is 0 to 3, and Ar is an aromatic group having 6 to 20 carbon atoms.

15. A method for preparing an aromatic polycarbonate, which comprises polycondensing an aromatic dihydroxy compound comprises mainly bisphenol A in the form of an orthorhombic crystal and a carbonic acid diester in the presence of, as an ester exchange catalyst, an alkali metal compound and a nitrogen-containing basic compound and/or a phosphorus-containing basic compound, the alkali metal compound being used in an amount of $1 \times 10^{-7}$ to $1 \times 10^{-5}$ equivalent in terms of alkali metal atoms and the nitrogen-containing basic compound and/or the phosphorus-containing basic compound being used in a total amount of $5 \times 10^{-5}$ to $1 \times 10^{-3}$ equivalent in terms of nitrogen atoms and/or phosphorus atoms based on 1 mol of the aromatic dihydroxy compound, so as to form the aromatic polycarbonate of claim 1.

16. A molded product of the aromatic polycarbonate of claim 1.

17. The molded product of claim 16 which is a substrate for optical recording media.

18. The molded product of claim 16 which is in a form of a film or sheet.

* * * * *

UNITED STATES PATENT AND TRADEMARK OFFICE
CERTIFICATE OF CORRECTION

PATENT NO.    : 6,509,435 B1                                              Page 1 of 1
DATED         : January 21, 2003
INVENTOR(S)   : Yuichi Kageyama et al.

It is certified that error appears in the above-identified patent and that said Letters Patent is hereby corrected as shown below:

<u>Title page, Item [54] and Column 1, lines 1-3,</u>
Please change "POLYCABONATE, PROCESS FOR PRODUCING THE SAME, AND MOLDED ARTICLE THEREOF" to -- POLYCARBONATE, PROCESS FOR PRODUCING THE SAME, AND MOLDED ARTICLE THEREOF --.

Signed and Sealed this

Fifteenth Day of July, 2003

JAMES E. ROGAN
*Director of the United States Patent and Trademark Office*